United States Patent [19]
DuBois et al.

[11] Patent Number: 5,757,096
[45] Date of Patent: May 26, 1998

[54] ALTERNATOR COOLING DEVICE

[76] Inventors: Randy P. DuBois, 7218 Ketchel Dr., Comstock Park, Mich. 49321; David M. DuBois, 112 Baldwin Dr., Jenison, Mich. 49428

[21] Appl. No.: 527,221

[22] Filed: Sep. 12, 1995

[51] Int. Cl.$^6$ ............................................. H02K 5/18
[52] U.S. Cl. ..................... 310/68 D; 310/64; 361/710
[58] Field of Search ................................ 310/64, 68 D; 361/697, 692, 703, 710, 701

[56] References Cited

U.S. PATENT DOCUMENTS

| | | | |
|---|---|---|---|
| 3,518,468 | 6/1970 | Wightman | 310/64 |
| 3,553,505 | 1/1971 | Sato | 310/68 |
| 3,684,944 | 8/1972 | Evgrafov et al. | 321/8 |
| 4,162,419 | 7/1979 | DeAngelis | 310/266 |
| 4,191,245 | 3/1980 | Wendt et al. | 165/69 |
| 4,284,914 | 8/1981 | Hagenlocher et al. | 310/68 D |
| 4,286,186 | 8/1981 | Hagenlocher et al. | 310/89 |
| 4,926,076 | 5/1990 | Nimura | 310/68 D |
| 5,019,735 | 5/1991 | Lee | 310/89 |
| 5,111,089 | 5/1992 | Wakuta et al. | 310/54 |
| 5,233,246 | 8/1993 | Yockey | 310/71 |
| 5,258,673 | 11/1993 | Gotoh | 310/68 D |
| 5,473,208 | 12/1995 | Stihi | 310/68 D |

FOREIGN PATENT DOCUMENTS

| | | |
|---|---|---|
| 1352823 | 1/1964 | France . |
| 1 168 552 | 4/1964 | Germany . |

*Primary Examiner*—Steven L. Stephan
*Assistant Examiner*—Judson H. Jones
*Attorney, Agent, or Firm*—Richard C. Litman

[57] ABSTRACT

A device having a plurality of heat dissipation fins providing improved cooling to an alternator rectifier. The device may be removably attached to the alternator rear housing proximate the location of the rectifier. The device may also be incorporated as an integral part of the alternator rear housing. The device provides improved cooling to the alternator by increasing the surface area of the alternator rear housing at the area of the housing heated by the rectifier.

16 Claims, 5 Drawing Sheets

ALTERNATOR COOLING DEVICE

BACKGROUND OF THE INVENTION

1. Field of the Invention

The present invention relates to automobile alternator housings which promote rectifier diode cooling. Specifically this invention relates to the addition of heat dissipation fins to an alternator housing proximate the rectifier.

2. Description of the Prior Art

Automobile alternators typically include a rectifier assembly for converting the alternating current output of the alternator to direct current used by the automobile. These rectifier assemblies normally consist of a system of diodes mounted on a carrier. The carrier is usually fastened to the interior of the rear housing of the alternator. Thus, the rectifier diodes are commonly placed inside an alternator housing which in turn is within the hot engine compartment of an automobile. Since the diodes produce heat, if the rectifier is not adequately cooled then the rectifier diodes may burn out. Many alternator designs have been developed with an eye to cooling an internal rectifier to prevent rectifier diode burnout.

Rectifier cooling is commonly accomplished by means of cooling air as is shown by the following prior art. U.S. Pat. No. 5,019,735 issued May 28, 1991, to J. J. Lee shows a case providing ventilation to cool a fan motor. U.S. Pat. Nos. 4,162,419 issued Jul. 24, 1979, to L. E. DeAngles, and 4,926,076 issued May 15, 1990, to T. Nimura et al. both show alternators having fans to air cool rectifiers. U.S. Pat. Nos. 4,284,914 issued Aug. 18, 1981, and 4,286,186 issued Aug. 25, 1981 to W. Hagenlocher et al. show alternator end caps which may include vents designed to direct air over a rectifier. U.S. Pat. No. 5,233,246 issued Aug. 3, 1993, to S. J. Yockey shows a rectifier terminal including air lovers. As cooling air has been the traditional method of cooling rectifiers, the prior shows few alternatives to this method. U.S Pat. No. 3,553,505, issued Jan. 1, 1971, to S. Sato does show a rectifier carrier having a design which improves efficiency during manufacture, the carrier also may improve heat dissipation. U.S. Pat. No. 4,191,245 issued Mar. 4, 1980, to M. E. Wendt et al. shows the concept of heat dissipation fins applied to a motor mounting arrangement. Foreign Patents which show alternator housings of interest include German patent 1,168,552 dated Apr. 23, 1964 and French Patent 1,352,823 dated Jan. 13, 1964.

None of the above inventions and patents, taken either singly or in combination, is seen to describe the instant invention as claimed.

SUMMARY OF THE INVENTION

As discussed above it is important to carefully design alternators and alternator housings to provide means to cool the rectifier diodes in order to prevent burnout. The present invention provides heat dissipation fins on the alternator housing proximate to the rectifier. These fins promote heat dissipation in the area of the rectifier and, thus, prevent rectifier diode burnout. These fins may be cast as a part of the alternator housing or may be in the form of a supplemental piece attached to the housing. The heat dissipation fins have the advantage of being a useful addition for existing alternators which have known rectifier burnout problems, such as Delco-Remy CS-121 and CS-130 alternators.

Currently an alternator rebuilder will replace the rectifier with a more heavy duty model when refurbishing an alternator known to have a chronic rectifier burnout problem. This solution has not been found to be entirely successful, as in some types of alternators the heavy duty rectifiers will also burnout prematurely. The present invention either in the form of a supplemental attachment to the alternator or in the form of a replacement rear housing for the alternator provides alternator rebuilders with a reliable solution for preventing rectifier burnout in types of alternators known to have chronic rectifier burnout problems.

Accordingly, it is a principal object of the invention to provide heat dissipation fins on the outer surface of an alternator housing proximate to the rectifier to promote rectifier cooling.

It is another object of the invention to provide a supplemental attachment including heat dissipation fins to be fastened to an alternator housing proximate the rectifier.

It is a further object of the invention to provide replacement rear housings providing heat dissipation fins for alternators with existing rectifier diode burnout problems.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
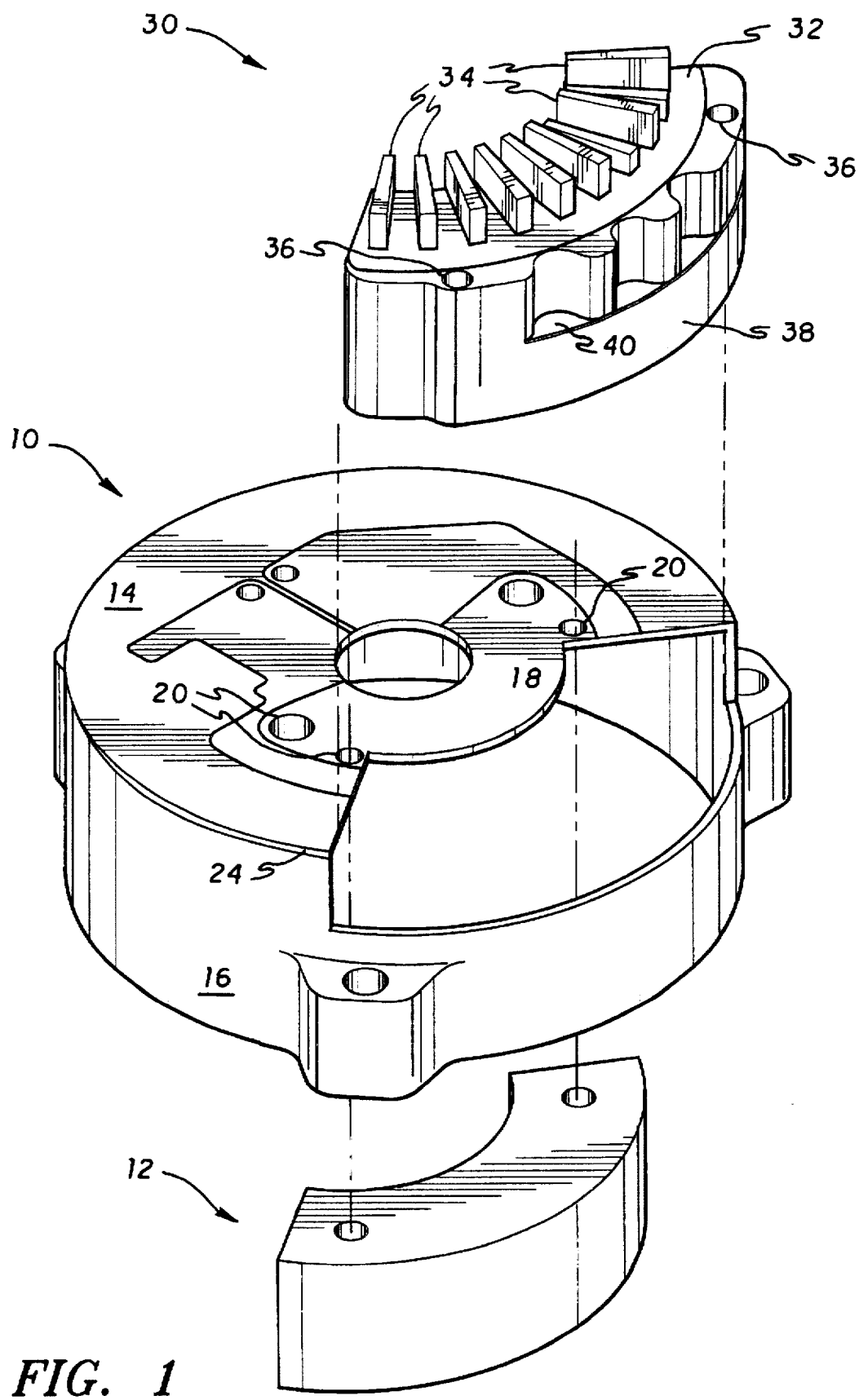
FIG. 1 is an exploded view showing the attachment of a rectifier and the heat dissipation attachment of the present invention to a alternator rear housing.

A heat dissipation attachment 30, for solving chronic alternator rectifier burnout problems, is shown in FIG. 1 with an alternator rear housing 10 and rectifier assembly 12. Alternator housing 10 has a substantially cylindrical shape formed from a substantially cylindrical side wall 16 and a rear wall 14 disposed across an end of side wall 16. Side wall 16 includes attachment points for securing rear housing 10 to a front housing and also includes ventilation openings (see FIG. 3). Rear wall 14 is generally circular and has a centrally disposed ring defining rear bearing aperture 18. A number of attachment points 20 for securing alternator components, such as a rectifier assembly or brush assembly, to the interior of housing 10 are also provided on rear wall 14. Component attachment points may also be provided on side wall 16. Rear wall 14 includes ventilation openings 22 disposed on a section of rear wall 14 adjacent bearing aperture 18 (see FIG. 2A). Rear housing 10 may also include external means for mounting the alternator.

The mounting location of rectifier assembly 12 within the interior of rear housing 10 is shown in FIG. 1. Rectifier assembly 12 is secured to the interior of a solid portion of rear wall 14 located between the rear bearing aperture 18 and the corner 24 connecting rear wall 14 with side wall 16. The rectifier typically abuts a portion of the interior of rear wall extending through at least one quadrant of the rear wall.

The rectifier assembly 12 produces heat which if not dissipated will cause the rectifier to burnout. Heat dissipation attachment 30 is provided to enhance the heat dissipation capability of alternator housing 10 specifically in the area abutting rectifier assembly 12. Heat dissipation attachment 30 is secured to attachment points which have been formed on the exterior of rear housing 10. Also, heat dissipation attachment 30 preserves the existing air flow over the rectifier.

Heat dissipation attachment 30 includes a base 32 from which extends a plurality of heat dissipation fins 34. Attachment 30 is formed from a heat conductive material such as aluminum. Bolt holes 36 are included on attachment 30 for securing the device to attachment points on rear housing 10. Base 32 of attachment 30 has a flat arcuate shape which fits over an exterior portion of rear wall 14 opposite the interior portion of rear wall 14 abutting rectifier assembly 12. Attachment 30 may replace an existing cover placed over side ventilation openings on housing 10. Therefore, attachment 30 includes depending curved side wall 38. Side wall 38 includes ventilation openings 40 to maintain air flow over rectifier assembly 12. Heat dissipation fins 34 are arranged in a closely spaced radial arrangement across base 32. Heat dissipation fins 34 have a narrow width, and long length, thus maximizing the surface area of attachment 30 in the limited space available. The height of fins 34 is limited to less than their length. To facilitate manufacture fins 34 may have wedge shape along the radial dimension producing a slightly tapered horizontal cross section, as shown in FIG. 2. Fins 34 are closely spaced and thus are separated by a distance approximating their width. Heat dissipation attachment 30 is secured to rear housing 10 such that there is substantial contact between heat dissipation attachment 30 and housing 10. When installed, heat from rectifier assembly 12 is conducted through rear housing 10 to attachment 30 where it is dissipated by fins 34. Thus, heat dissipation attachment 30 maintains rectifier assembly 12 at a sufficiently low temperature to prevent rectifier burnout.

Figure 2A:
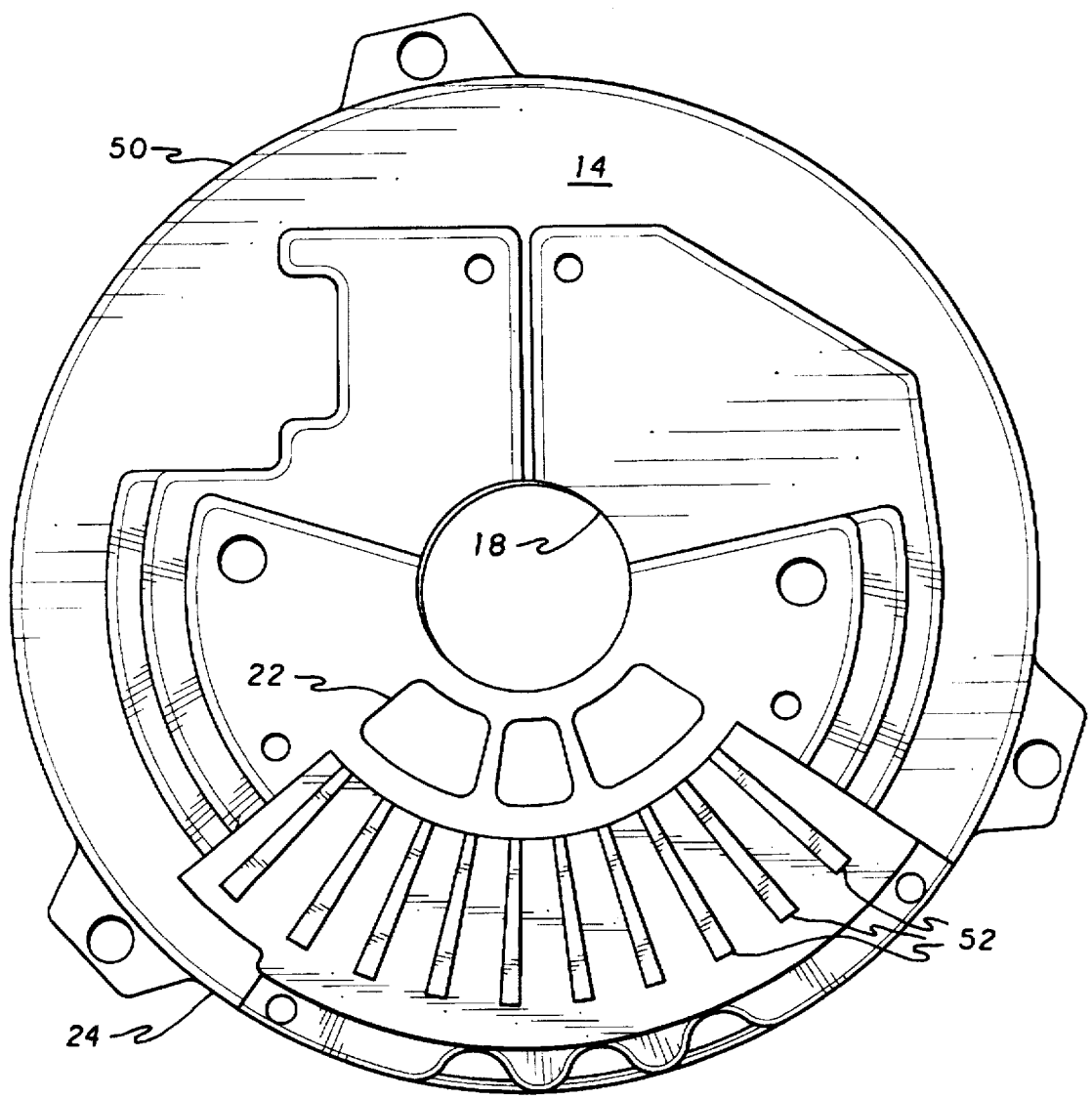
FIG. 2A is a top view of an alternator rear housing according to the present invention.
Figure 2B:
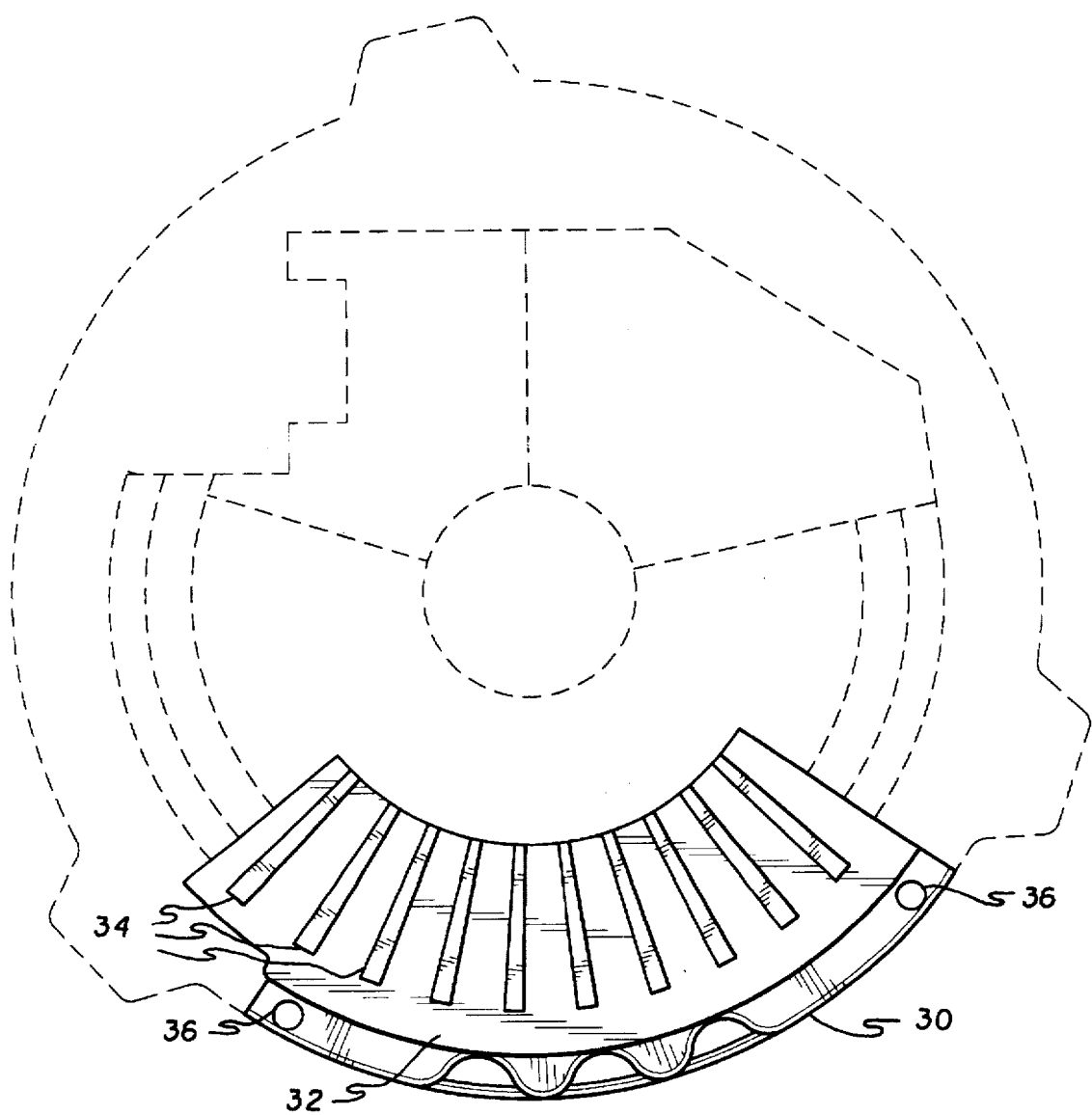
FIG. 2B is a top view of the heat dissipation attachment shown in FIG. 1.
Figure 3A:
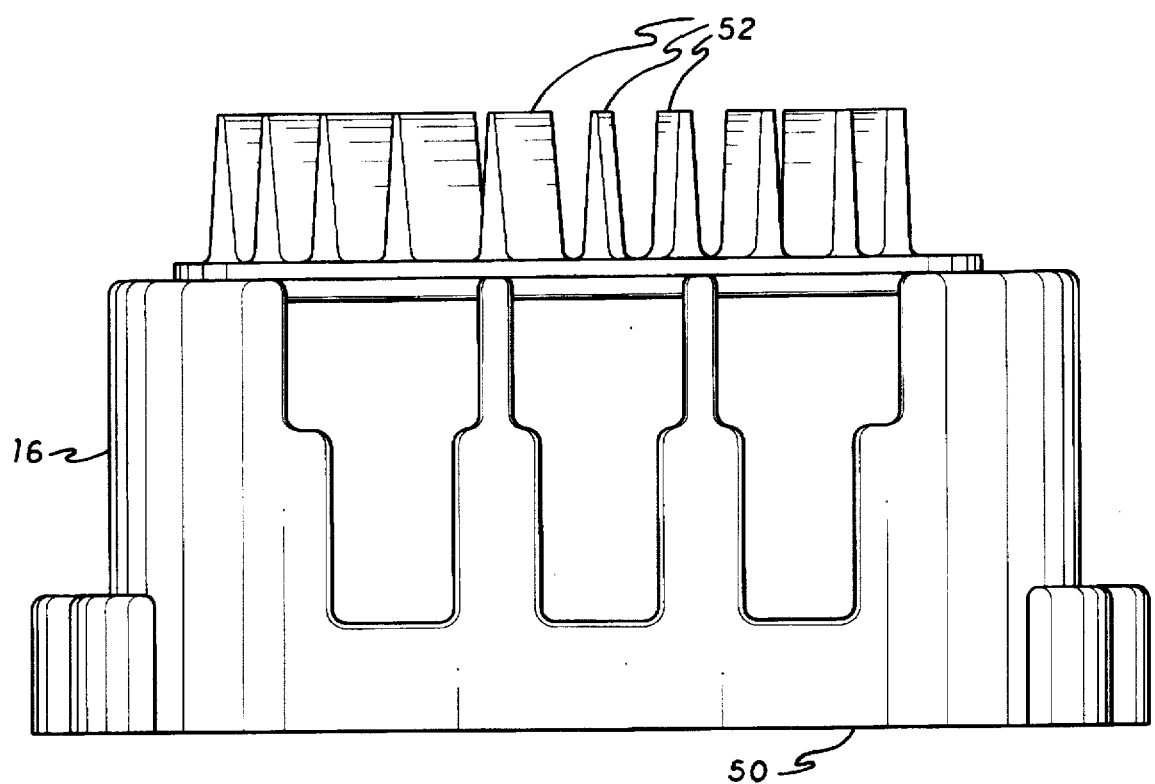
FIG. 3A is a side view of the alternator rear housing of FIG. 2A.
Figure 3B:
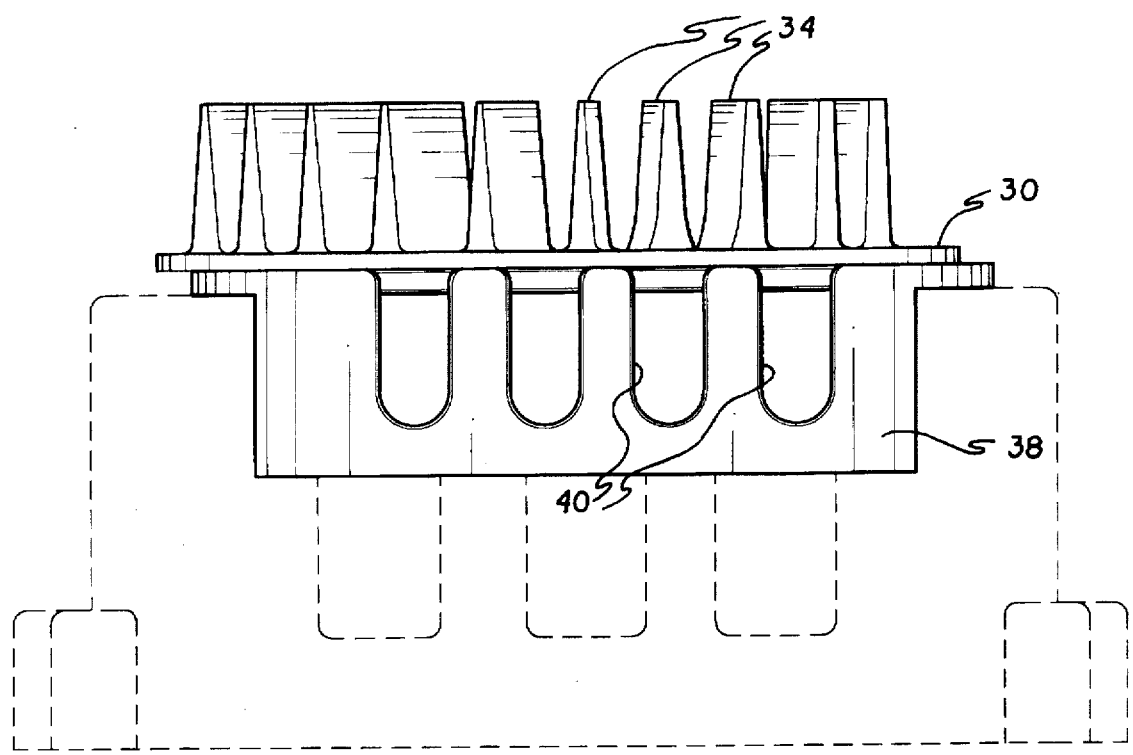
FIG. 3B is a side view of the heat dissipation attachment shown in FIG. 1.

Rear housing 50 is shown in FIG. 2A according to an alternate embodiment of the present invention. Rear housing 50 has all of the features of rear housing 10 with the addition of integral external heat dissipation fins 52 disposed on rear wall 14. Heat dissipation fins 52 extend from the exterior of rear housing 40 opposite the interior attachment location of rectifier assembly 12. To maximize the surface area of the exterior of rear housing 50 in the region of rectifier 12, heat dissipation fins 52 are cast as a inherent part of rear housing 50. Rear housing 50 is formed from a heat conductive material such as aluminum. Heat dissipation fins 52 protruding from rear housing 50 have the same characteristics as fins 34 included on heat dissipation attachment 30. Heat dissipation fins 52 protrude from the same solid section 26 situated between ventilation openings 22 and outer corner 24 over which attachment 30 fits on housing 10. Similarly, protruding fins 52 have a closely spaced radial arrangement which extends through at least one quadrant of rear wall 14. Heat dissipation fins 52, thus, provide rear housing 50 with the necessary surface area proximate the rectifier to prevent rectifier diode burnout.

It is to be understood that the present invention is not limited to the sole embodiment described above, but encompasses any and all embodiments within the scope of the following claims.

We claim:

1. An alternator heat dissipation attachment for preventing rectifier burnout, the attachment comprising:

a arcuate heat conductive base plate having a substantially flat horizontal upper surface, said base plate including means for attachment to an alternator rear housing proximate a rectifier, a plurality of closely spaced, narrow, long, heat conductive fins protruding from the upper surface of said base plate, said fins oriented radially across said base, and a curved side wall depending from said base plate.

2. The heat dissipation attachment according to claim 1, wherein said means for attachment comprises bolt holes.

3. The heat dissipation attachment according to claim 1, wherein said arcuate base plate extends through at least ninety degrees.

4. The heat dissipation attachment according to claim 1, wherein said fins have a longer length than height.

5. The heat dissipation attachment according to claim 1, wherein said fins have a tapered horizontal cross section.

6. The heat dissipation attachment according to claim 1, wherein said curved side wall has ventilation openings.

7. An alternator rear housing comprising:

a substantially cylindrical side wall having an end;

a substantially circular rear wall having an interior surface and an exterior surface, said rear wall joining said side wall at a corner, said rear wall closing the end of said side wall, said interior surface of said rear wall facing said side wall, said rear wall including a solid section for attaching a rectifier to the interior surface; and a plurality of heat dissipation fins protruding from the exterior surface of said rear wall.

8. The alternator rear housing according to claim 7, wherein said rear wall and said fins are composed of a heat conductive material.

9. The alternator rear housing according to claim 7, further comprising means for attaching a rectifier assembly in a location abutting the interior of said rear wall, wherein said fins are disposed proximate to the location of attachment for the rectifier assembly.

10. The alternator rear housing according to claim 9, further comprising means for supporting a rear rotor bearing comprising a central aperture in said rear wall.

11. The alternator rear housing according to claim 10, wherein said fins have a tapered shape.

12. The alternator rear housing according to claim 10, wherein said fins have a longer length than height.

13. The alternator rear housing according to claim 10, wherein said fins are disposed in a closely spaced radial alignment on said rear wall.

14. The alternator rear housing according to claim 13, wherein said plurality of fins extends over at least one quadrant of said rear wall.

15. The alternator rear housing according to claim 13, wherein said rear wall includes ventilation openings adjacent said central aperture, and said fins protrude from a surface disposed between said ventilation openings and the corner joining said sidewall with said rear wall.

16. An alternator rear housing providing for improved cooling of a rectifier housed within, said housing comprising:

a substantially circular heat conductive rear wall having an exterior surface and an interior surface, said rear wall including, a central circular ring defining a central aperture, said ring for holding an alternator rear bearing, a vented section adjacent said ring having a plurality of ventilation openings for providing air flow around the alternator rectifier, a solid section located radially outward from said vented section, said solid section extending through at least one quadrant of said rear wall, said solid section for attaching the rectifier to the interior surface of said rear wall;

a substantially cylindrical side wall depending from the interior surface of said rear wall; and a plurality of substantially rectangular, heat conductive, dissipation fins extending from the exterior surface of the rear wall in a closely spaced radial arrangement from the solid section of said rear wall.

* * * * *